Sept. 9, 1952  H. H. LEMMERMAN  2,610,011
ADJUSTING SUPPORTING DEVICE
Filed April 10, 1951
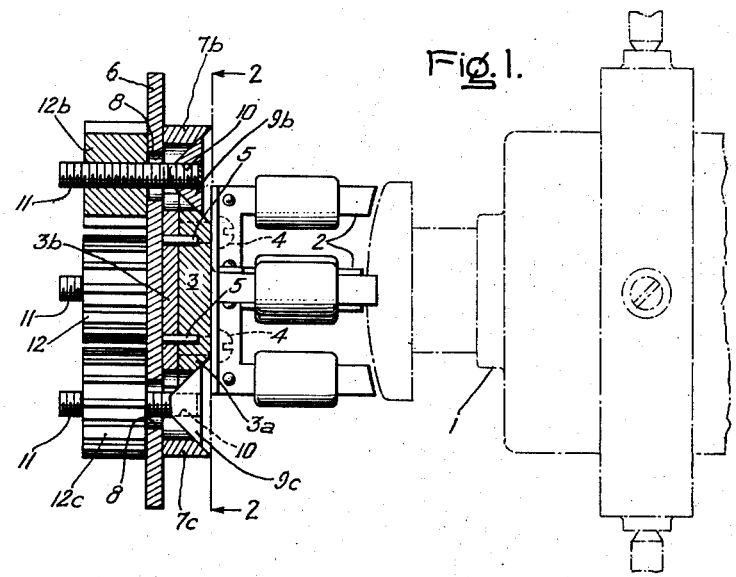
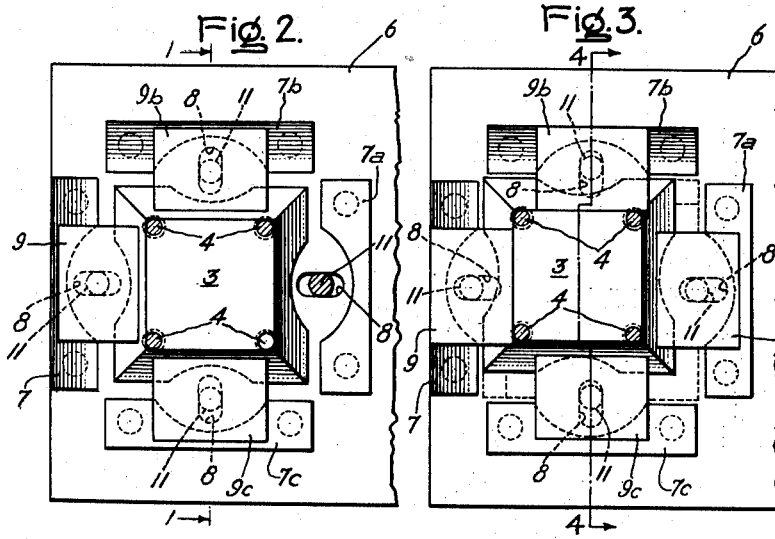
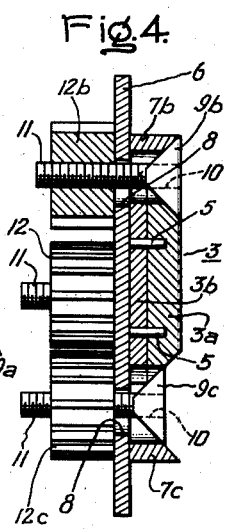
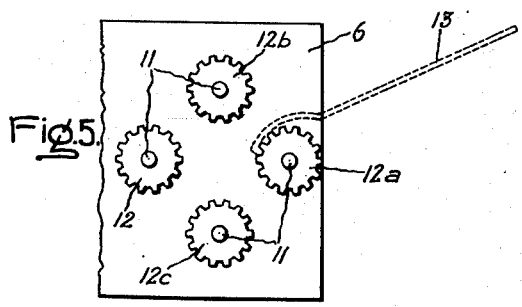
Inventor:
Harold H. P. Lemmerman,
by Claude A. Mott
His Attorney.

Patented Sept. 9, 1952

2,610,011

UNITED STATES PATENT OFFICE 2,610,011

ADJUSTING SUPPORTING DEVICE

Harold H. Lemmerman, Schenectady, N. Y., assignor to General Electric Company, a corporation of New York Application April 10, 1951, Serial No. 220,309

2 Claims. (Cl. 248—23)

This inventon relates to adjustable supporting devices and more particularly to adjustable supports for the E pick-off mechanisms of gyroscopes.

The E pick-off of a gyroscope is adjusted by moving it on its support in a plane perpendicular to the axis of spin of the gyroscope. It is necessary that the E pick-off be independently movable in the plane in both directions which are mutually perpendicular to the spin axis of the gyroscope, and it is also very desirable that the E pick-off does not have a motion along the spin axis during the adjustment process.

In the past this desirable characteristic of two independent movements of the E pick-off has been accomplished by the use of ways. However, this method is limited because the volume of the support becomes excessive due to the number of plates needed. Moreover, the machining of the ways for smooth and accurate motion may be somewhat difficult. Back lash in the cams which can at times make the control of the E pick-off somewhat indeterminate presents another difficulty. And still another unfavorable aspect of the use of ways is that when the hold down screws are loosened sufficiently for the cams to move the E pick-off, undesirable motion along the spin axis of the gyroscope is often encountered. When the hold down screws are again tightened, this may result in an apparent change in the adjustment.

It is an object, therefore, of this invention to provide a simple adjustable precision support for the E pick-off mechanism of a gyroscope.

It is a further object of this invention to provide for the E pick-off mechanism of a gyroscope an adjustable support which permits independent movement of the E pick-off in both directions perpendicular to the gyroscope spin axis but does not permit motion along the spin axis.

In carrying out a preferred embodiment of this invention, the gyro E pick-off is mounted on the top of a supporting or actuated member having oppositely inclined sides or faces. More specifically the supporting member is shaped basically in the form of a rectangular truncated pyramid. The supporting member rests on a flat base plate in an essentially rectangular area enclosed by four bar shaped members, which are firmly secured to the base plate. Each guide member bounds a corresponding side of the enclosed area. On their sides facing the supporting member the guide members have inclined surfaces which made obtuse angles with the enclosed surface of the base. Between each guide member and the supporting member is placed a wedge shaped actuating member whose sides engage and mate with the adjacent inclined sides of the guide member and the faces of the supporting member. Under each wedge shaped member an aperture is cut in the base plate and to the point of each wedge shaped member is attached a threaded projection which extends through the associated aperture and has a nut mounted on its end.

Adjustment of the supporting member is made by means of the nuts. By tightening the nut associated with one wedge member and loosening the nut of the opposite wedge member, the supporting member is forced in the direction of the wedge whose nut was loosened. This action occurs because as the one wedge is pulled toward the base plate by the tightening of its nut, the inclined surface of the guide member causes the wedge to move toward the supporting member and thus cause the supporting member to move. Loosening the nut of the opposite wedge permits it to ride outward and upward as the supporting member moves against it. When the desired position of adjustment is reached retightening the loosened nut holds the supporting member firmly in place. Motion along the base perpendicular to the desired motion and motion along the spin axis are prevented by the mating of the other two wedges with the other inclined sides of the supporting member and the guide members. When motion perpendicular to the first motion is desired, the first wedges are left in place while the other wedges are adjusted by means of the nuts.

For a better and more complete understanding of my invention, together with additional objects and advantages thereof, reference should now be had to the following description and accompanying drawing in which:

Fig. 1 is a sectional view, taken on the line 1—1 of Fig. 2, of a preferred embodiment of the adjustable support of my invention together with its associated E pick-off mechanism and a portion of the gyroscope acted upon by the E pick-off;

Fig. 2 is a plan view of the support taken on the line 2—2 of Fig. 1;

Fig. 3 is a similar plan view of the support but shows it adjusted to a different position from that of Fig. 2;

Fig. 4 is a sectional view taken on the line 4—4 of Fig. 3; and

Fig. 5 is a view of the bottom of the support.

Referring to Fig. 1, a portion of a gyroscope I is acted upon by an E pick-off device 2, which is mounted on a supporting or actuated member 3 by screws 4. Supporting member 3 consists of an upper section 3a and a lower section 3b held together by pins 5. As is shown in Figs. 2 and 4 supporting member 3 has oppositely inclined sides or faces and may be said to be shaped basically in the form of a rectangular truncated pyramid. The base of supporting member 3, or pyramid 3 as it is hereinafter named, rests on a flat surface of a base plate 6 in a substantially rectangular area enclosed by four bar shaped guide members 7, 7a, 7b and 7c which are firmly secured to base plate 6. The surface area enclosed by guide members 7, 7a, 7b and 7c is larger than the area of the base of pyramid 3 and the surfaces of the guide members adjacent the enclosed surface are inclined to form substantially equal obtuse angles with it. The center portions of these inclined surfaces are recessed to provide clearance for slots 8 which are cut in base plate 6. The center portions of the inclined sides of pyramid 3 are similarly recessed to provide clearance for slots 8.

In other words when pyramid 3 is centered in the area enclosed by guide members 7, 7a, 7b and 7c and pyramid 3, slots 8 lie in the base plate areas principally bounded by the recessed portions of the adjacent inclined sides of guide members 7, 7a, 7b and 7c and the faces of pyramid 3. Slots 8 extend longitudinally toward the center of base plate 3, the center line of opposite slots coinciding. Positioned over slots 8 with their sides respectively engaging and mating with the adjacent inclined sides of guides 7, 7a, 7b and 7c and pyramid 3 are wedge shaped actuating members 9, 9a, 9b and 9c. Screwed into tapped recesses 10, which in each of the wedges 9, 9a, 9b and 9c extend from the point toward the base, are threaded dowels 11. Threaded on the ends of dowels 11 which project through base plate 6 are splined nuts 12, 12a, 12b and 12c. The tightening of nuts 12, 12a, 12b and 12c forces wedges 9, 9a, 9b and 9c, respectively, into the spaces between guide members 7, 7a, 7b and 7c and pyramid 3 and thereby constrains pyramid 3 from moving.

The position of pyramid 3 and thus the adjustment of E pick-off 2 is varied by loosening and tightening nuts 12, 12a, 12b and 12c in the proper sequence. Referring to Figs. 1 and 2 as showing a first position of the support and to Figs. 3 and 4 as showing a second position of the support and to Fig. 5 for reference as to the adjusting nuts, pyramid 3 must be moved in both aforementioned perpendicular directions in order to change from the first position to the second position. Movement in the first direction is accomplished by loosening nut 12 so that wedge 9 is free to move upward, and then tightening nut 12a. Tool 13 may be used to loosen and tighten the nuts. Tightening nut 12a causes wedge 9a to move downward against the inclined surface of guide 7a. The inclined surface forces wedge 9a as it moves downward also to move toward pyramid 3. This movement advances pyramid 3 across base plate 6 against wedge 9 and the mating between their inclined surfaces thereby causes wedge 9 to move upward and outward on guide 7. When pyramid 3 has moved the desired distance across the base plate 6, nut 12 is tightened and wedge 9 again constrains pyramid 3 from movement.

During this operation motion along the base lateral to the desired movement and motion along the spin axis of the gyroscope are prevented by wedges 9b and 9c engaging and mating with the associated inclined faces of support 3 and guide members 7b and 7c adjacent them. Nuts 12b and 12c are kept moderately tight so that wedges 9b and 9c perform the above-mentioned function but do not cause sufficient friction to prevent movement of support 3 in the desired direction.

Movement lateral to the direction of motion discussed above is accomplished by a like procedure, nuts 12b and 12c being respectively loosened and tightened, while nuts 12 and 12a are held moderately tight to prevent undesired motions in other directions.

Thus by the selective tightening and loosening of the nuts, supporting member 3 may be moved from the first position to the second position without any motion along the gyro spin axis. Moreover, independent motion is accomplished along both directions perpendicular to the gyro spin axis in the plane of the base plate.

While what has been described is at present considered to be the preferred embodiment of this invention it wil be obvious to those skilled in the art that various changes and modifications may be made therein without departing from the invention, and it is therefore aimed in the appended claims to cover all such changes and modifications as fall within the true spirit and scope of the invention.

What I claim as new and desire to secure by Letters Patent of the United States is:

1. An adjustable support comprising a base member having a flat surface, four bar shaped guide members arranged to enclose a rectangular area and secured to said flat surface with each of said guide members bounding a corresponding side of said area and each having a surface inclined to said flat surface of said base member with the inclined surfaces of opposite guide members facing each other, a truncated rectangular pyramidal supporting member having a flat base surface slidably engaging said flat surface of said base member with each of its faces opposing a corresponding one of said inclined surfaces, four actuating wedge members one for each face of said pyramidal member and each having inclined surfaces mating with and engaging a face of said pyramidal member and an inclined surface of the corresponding guide member, and individual screw means for each of said wedges to provide selective application of forces to said actuating members in a direction normal to said flat base surface to slide said pyramidal member in a selected direction along said flat base surface and to secure said pyramidal member in a desired location thereon.

2. An adjustable support comprising a base member having a flat surface containing a plurality of apertures, four bar shaped guide members arranged to enclose a rectangular area and secured to said flat surface with each of said guide members bounding a corresponding side of said area and each having a surface inclined to said flat surface of said base member to form an obtuse angle therewith and with the inclined surfaces of opposite guide members facing each other, a truncated rectangular pyramidal supporting member having a flat base surface slidably engaging said flat surface of said base member with each of its faces opposing a corresponding one of said inclined surfaces, four actuating wedge members one for each face of said pyramidal member and each having inclined surfaces mating with and engaging a face of said pyramidal member and an inclined surface of the corresponding guide member, individual threaded dowels secured to said wedges and extending through said apertures and splined nuts threaded on said dowels to provide a selective application of forces to said actuating members in a direction normal to said flat base surface to slide said pyramidal member in a selected direction along said flat base surface and to secure said pyramidal member in a desired location thereon.

HAROLD H. LEMMERMAN.

REFERENCES CITED

The following references are of record in the file of this patent:

UNITED STATES PATENTS

| Number | Name | Date |
|---|---|---|
| 744,559 | Kendrick | Nov. 17, 1903 |
| 802,394 | Hill | Oct. 24, 1905 |
| 1,211,352 | Rathburn | Apr. 2, 1917 |
| 1,490,608 | Gilmore | Apr. 15, 1924 |
| 2,430,613 | Hodge | Nov. 11, 1947 |